(12) United States Patent
Olson

(10) Patent No.: US 12,478,506 B2
(45) Date of Patent: *Nov. 25, 2025

(54) EAR CLEANER

(71) Applicant: Quest Products, LLC, Pleasant Prairie, WI (US)

(72) Inventor: Richard Carl Olson, Deerfield Beach, FL (US)

(73) Assignee: Quest Products, LLC, Pleasant Prairie, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,270

(22) Filed: Jan. 12, 2024

(65) Prior Publication Data

US 2024/0225901 A1 Jul. 11, 2024

Related U.S. Application Data

(63) Continuation of application No. 16/739,859, filed on Jan. 10, 2020, now Pat. No. 11,890,167, which is a continuation of application No. 15/655,332, filed on Jul. 20, 2017, now Pat. No. 10,531,986, which is a continuation-in-part of application No. 29/567,975, filed on Jun. 14, 2016, now Pat. No. Des. 847,993.

(51) Int. Cl.
*A61F 11/00* (2022.01)

(52) U.S. Cl.
CPC ....... *A61F 11/006* (2013.01); *A61F 2240/001* (2013.01); *A61F 2250/0014* (2013.01); *A61F 2250/0037* (2013.01)

(58) Field of Classification Search
CPC A61F 11/00; A61F 11/006; A61F 2250/0014; A61F 2250/0037; A61B 17/22; A61B 17/50

See application file for complete search history.

(56) References Cited

U.S. PATENT DOCUMENTS

| | | |
|---|---|---|
| 147,660 A | 2/1874 | Leiner |
| 651,395 A | 6/1900 | Stapp |
| D144,599 S | 4/1946 | Tupper |
| 3,099,263 A | 7/1963 | Palazzolo |
| 3,203,418 A | 8/1965 | Johnston |
| 4,091,497 A | 5/1978 | Bade |
| 4,411,265 A | 10/1983 | Eichenlaub |
| 4,568,326 A | 2/1986 | Rangaswamy |
| D296,005 S | 5/1988 | Alkire |
| 4,746,238 A | 5/1988 | Levine |

(Continued)

FOREIGN PATENT DOCUMENTS

| | | |
|---|---|---|
| AU | 2013100584 | 8/2013 |
| EP | 0158543 | 10/1985 |

(Continued)

OTHER PUBLICATIONS

U.S. Appl. No. 16/265,072, filed Feb. 1, 2019, Richard Carl Olson.

(Continued)

*Primary Examiner* — Vi X Nguyen
(74) *Attorney, Agent, or Firm* — Fitch, Even, Tabin & Flannery LLP

(57) ABSTRACT

An ear cleaner is provided that includes an elongated handle, a spoon, and a disc intermediate the spoon and the disc.

15 Claims, 3 Drawing Sheets

(56) References Cited

U.S. PATENT DOCUMENTS

| | | | |
|---|---|---|---|
| 4,935,001 A | 6/1990 | George | |
| 5,107,861 A | 4/1992 | Narboni | |
| D327,322 S | 6/1992 | Brewer, Jr. | |
| 5,223,259 A | 6/1993 | Lackney | |
| D339,036 S | 9/1993 | Mcdaniel | |
| 5,334,212 A | 8/1994 | Karell | |
| 5,374,276 A | 12/1994 | Lay | |
| D362,067 S | 9/1995 | Chang | |
| 5,509,921 A | 4/1996 | Karell | |
| 5,632,756 A | 5/1997 | Kruglick | |
| 5,715,850 A | 2/1998 | Markgraaf | |
| 5,738,643 A | 4/1998 | Stredic, III | |
| D405,175 S | 2/1999 | Stredic, III | |
| 5,888,199 A * | 3/1999 | Karell | A61F 11/006 606/162 |
| 5,897,568 A | 4/1999 | Vanraes | |
| D414,866 S | 10/1999 | Szabo | |
| D415,275 S | 10/1999 | Huttner | |
| D420,133 S | 2/2000 | Huttner | |
| 6,033,417 A | 3/2000 | Tseng | |
| D422,360 S | 4/2000 | Young | |
| 6,080,126 A | 6/2000 | Zygmont | |
| D432,239 S | 10/2000 | Shimizu | |
| D435,295 S | 12/2000 | Yoo | |
| D441,141 S | 4/2001 | Shalita | |
| D444,556 S | 7/2001 | Estrem | |
| 6,270,510 B1 | 8/2001 | Westendorf | |
| D469,871 S | 2/2003 | Sand | |
| 6,695,802 B1 | 2/2004 | Thompson | |
| D489,131 S | 4/2004 | Gojcaj | |
| D489,133 S | 4/2004 | Shimizu | |
| D490,523 S | 5/2004 | Samborski | |
| 6,736,826 B2 | 5/2004 | Begun | |
| 6,939,360 B2 | 9/2005 | Crespo | |
| D515,213 S | 2/2006 | Huttner | |
| 7,070,603 B2 | 7/2006 | Eicoff | |
| 7,074,230 B2 * | 7/2006 | Olson | A61F 11/006 606/162 |
| D526,061 S | 8/2006 | Nam | |
| D545,431 S | 6/2007 | Khademhosseini | |
| D546,948 S | 7/2007 | Huttner | |
| D547,869 S | 7/2007 | Eckman | |
| D560,800 S | 1/2008 | Curtis | |
| D560,806 S | 1/2008 | Eckman | |
| D567,373 S | 4/2008 | Irby | |
| D603,046 S | 10/2009 | Frey | |
| 7,658,745 B2 | 2/2010 | Olson | |
| D631,957 S | 2/2011 | Perez | |
| D638,985 S | 5/2011 | Limongi | |
| 7,951,106 B1 | 5/2011 | Perez | |
| D654,165 S | 2/2012 | Yates | |
| D701,600 S | 3/2014 | Kauffman | |
| 9,232,853 B2 | 1/2016 | Olson | |
| 9,233,027 B1 | 1/2016 | Jackson | |
| 9,278,030 B2 | 3/2016 | Olson | |
| D757,938 S | 5/2016 | Jackson | |
| 10,219,951 B2 | 3/2019 | Olson | |
| D847,993 S | 5/2019 | Olson | |
| 10,479,842 B2 | 11/2019 | Haley | |
| 10,531,986 B2 * | 1/2020 | Olson | A61F 11/006 |
| D921,897 S | 6/2021 | Chi | |
| 11,045,357 B2 | 6/2021 | Olson | |
| D952,849 S | 5/2022 | Olson | |
| D980,980 S | 3/2023 | Chi | |
| 11,890,167 B2 * | 2/2024 | Olson | A61F 11/006 |
| D1,059,883 S | 2/2025 | Xiong | |
| 2001/0001828 A1 | 5/2001 | Begun | |
| 2003/0135228 A1 | 7/2003 | Crespo | |
| 2003/0187469 A1 | 10/2003 | Olson | |
| 2003/0225431 A1 | 12/2003 | Yoo | |
| 2005/0027315 A1 | 2/2005 | Plateroti | |
| 2005/0070948 A1 | 3/2005 | Kirsteins | |
| 2005/0096678 A1 | 5/2005 | Olson | |
| 2005/0154429 A1 | 7/2005 | Huang | |
| 2005/0267507 A1 | 12/2005 | Kao | |
| 2008/0300527 A1 | 12/2008 | Bivins | |
| 2009/0248029 A1 | 10/2009 | Paulos | |
| 2010/0312198 A1 | 12/2010 | Guidi | |
| 2010/0330136 A1 | 12/2010 | Rocabayera Bonvila | |
| 2011/0179887 A1 | 7/2011 | Cobian | |
| 2012/0296355 A1 | 11/2012 | Burres | |
| 2013/0331804 A1 | 12/2013 | Nino | |
| 2014/0031846 A1 | 1/2014 | Edme | |
| 2014/0276893 A1 | 9/2014 | Schaller | |
| 2015/0018861 A1 | 1/2015 | Olson | |
| 2016/0175154 A1 | 6/2016 | Olson | |
| 2017/0087024 A1 | 3/2017 | Al-Bakkour | |
| 2017/0354541 A1 | 12/2017 | Olson | |
| 2019/0159936 A1 | 5/2019 | Olson | |
| 2020/0214895 A1 | 7/2020 | Olson | |
| 2021/0346206 A1 | 11/2021 | Olson | |
| 2021/0378912 A1 | 12/2021 | Nakano | |
| 2021/0378913 A1 | 12/2021 | Nakano | |
| 2021/0403228 A1 | 12/2021 | Nakano | |

FOREIGN PATENT DOCUMENTS

| | | |
|---|---|---|
| EP | 0234061 | 9/1987 |
| EP | 0875221 | 11/1998 |
| WO | 1996037172 | 11/1996 |

OTHER PUBLICATIONS

U.S. Appl. No. 29/567,975, filed Jun. 14, 2016, Richard Carl Olson.

U.S. Appl. No. 29/684,273, filed Mar. 19, 2019, Richard Carl Olson.

"Ototek Loop Ear Wax Removal." <https://www.amazon.com/Ototek-Loop-Ear-Wax-Removal/product-reviews/B008BXLINQ/ref=cm_cr_getr_d_paging_btm_next_35?ie=UTF8&reviewerType=all_reviews&sortBy=recent&pageNumber=35>, Aug. 13, 2012, 3 pages.

"Pictures of an Ear Cleaning Device and Its Retail Packaging." The ear cleaning device being publicly available before Jun. 14, 2016, 3 pages.

"Pictures of Another Clinere® Brand Ear Cleaner." The ear cleaning device being publicly available for purchase more than one year before Jul. 15, 2013, 3 pages.

"Pictures of Clinere® Brand Ear Cleaner." The ear cleaning device being publicly available for purchase more than one year before Jul. 15, 2013, 3 pages.

"Pictures of Ear Cleaner—Earvana 1." The ear cleaner being publicly available before Mar. 2013, 2 pages.

"Pictures of Ear Cleaner—Earvana 2." The ear cleaner being publicly available before Mar. 2013, 2 pages.

"Pictures of Ear Cleaner—Earvana 3." The ear cleaner being publicly available before Mar. 2013, 2 pages.

"Pictures of Ear Cleaner—Earvana 4." The ear cleaner being publicly available before Mar. 2013, 2 pages.

"Pictures of Ear Scrubber Ear Cleaner." The ear cleaner being publicly available Nov. 2015, 1 page.

"Pictures of Ototek Loop Ear Cleaner." The ear cleaner being publicly available for sale before Jul. 15, 2012, 3 pages.

"Pictures of Walgreens Brand Ear Cleaner." The ear cleaning device being publicly available for purchase on or about Jun. 29, 2017, 3 pages.

Clinere Earwax Cleaning Kit https://www.amazon.com/Clinere-Earwax-Cleaning-Kit/dp/BO101K30Pl/ref=sr_1_3_s_it?s=hpc&ie=UTF8&qid=1522946098&sr=1-3&keywords=clinere#customerReviews Jan. 7, 2017 (Year: 2017).

Final Office Action, U.S. Appl. No. 17/357,646, dated Jun. 2, 2023, 14 pages.

Final Office Action, U.S. Appl. No. 17/357,646, dated Apr. 18, 2024, 18 pages.

Office Action, U.S. Appl. No. 17/357,646, dated Dec. 2, 2022, 15 pages.

Office Action, U.S. Appl. No. 17/357,646, dated Sep. 22, 2023, 15 pages.

Ototek Loop Ear Wax Removal https://www.amazon.com/Ototek-Loop-Ear-Wax-Removal/dp/B008BXLINQ/ref=cm_cr_arp_d_product_top?ie=UTF8 Aug. 13, 2012 (Year: 2012).

(56) References Cited

OTHER PUBLICATIONS

Response to Office Action filed May 20, 2005, from U.S. Appl. No. 10/369,915, 4 pages.
Response to Office Action filed Office Action dated Jan. 5, 2006, from U.S. Appl. No. 10/369,915, 8 pages.
U.S. Appl. No. 29/836,835, "Ear Cleaner," filed Apr. 29, 2022, 14 pages.
United States Patent Office, Office Action dated Apr. 16, 2018, from related U.S. Appl. No. 29/567,975, 12 pages.
United States Patent Office, Office Action dated May 29, 2019, from related U.S. Appl. No. 15/655,332, 17 pages.
USPTO, Final Office Action dated Mar. 5, 2021, from U.S. Appl. No. 29/684,273.
YouTube video entitled "Smart Swab," posted Sep. 4, 2014, screen captures and video description, 5 pages. <https://youtu.be/XNSpdXUwNuM>.

\* cited by examiner

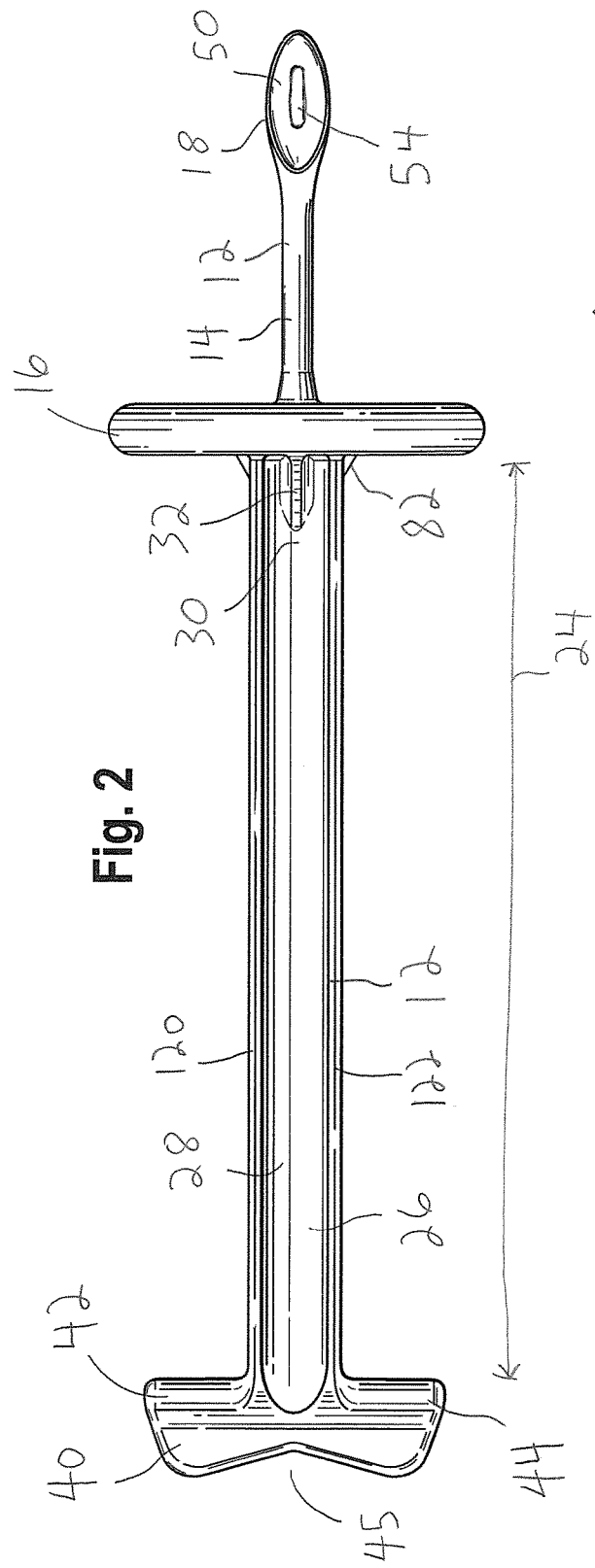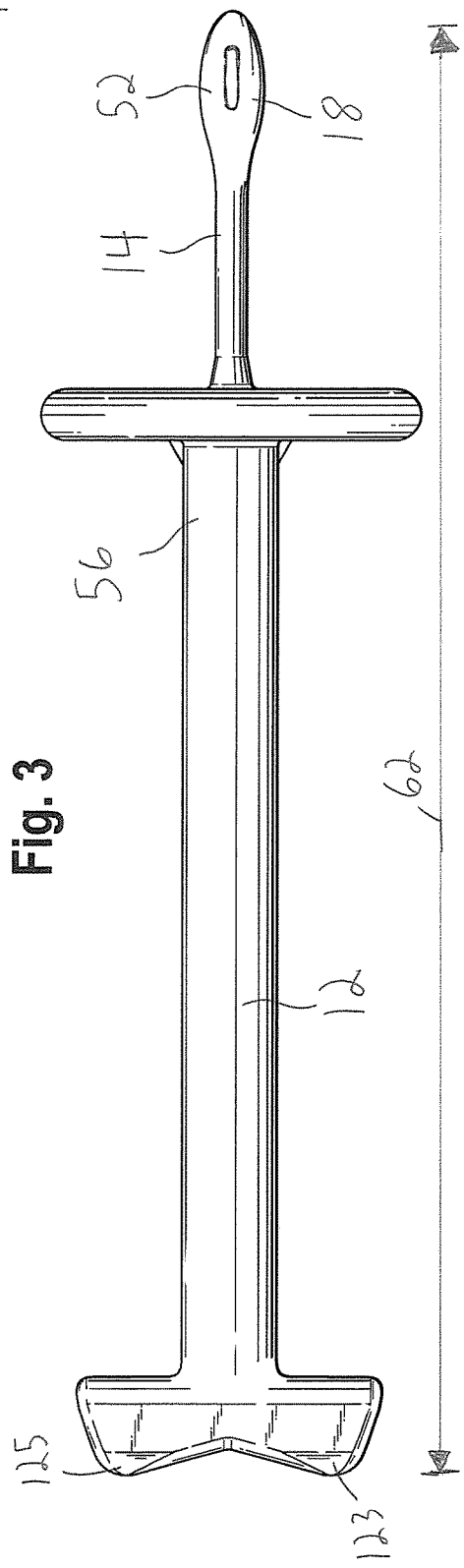

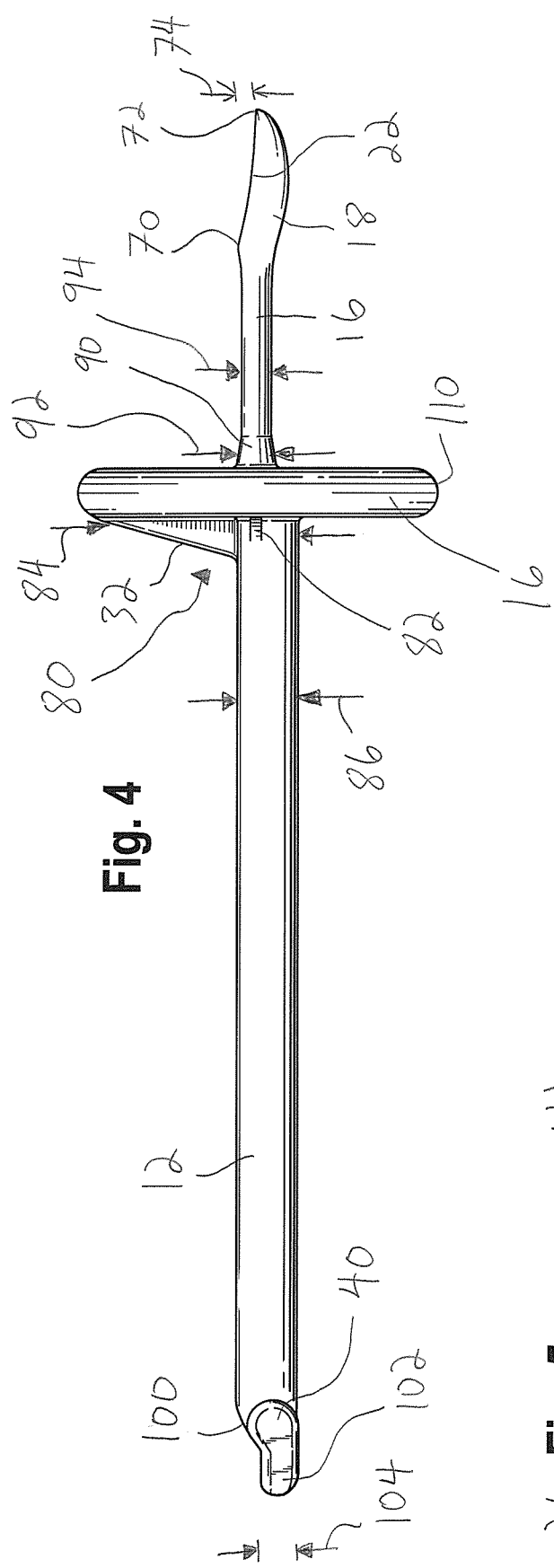
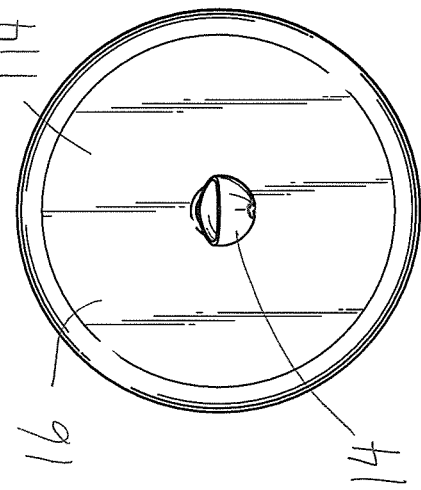
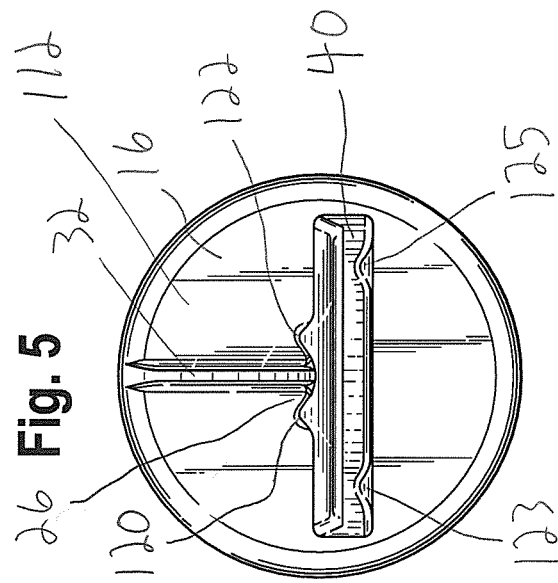

EAR CLEANER

CROSS-REFERENCE TO RELATED APPLICATIONS

This application is a continuation of U.S. patent application Ser. No. 16/739,859, filed on Jan. 10, 2020, which is a continuation of U.S. patent application Ser. No. 15/655,332, filed on Jul. 20, 2017, now U.S. Pat. No. 10,531,986, which is a continuation-in-part of U.S. Design patent application Ser. No. 29/567,975, filed Jun. 14, 2016, now U.S. Design Pat. No. D847,993, which are hereby incorporated by reference in their entireties.

FIELD

This disclosure relates to a device for ear cleaning.

BACKGROUND

Ear cleaners are known to remove debris, such as ear wax, from an ear.

BRIEF DESCRIPTION OF THE DRAWINGS

FIG. 2 is a top plan view of the ear cleaner of FIG. 1;
FIG. 3 is a bottom plan view of the ear cleaner of FIG. 1;
FIG. 4 is a side elevational view of the ear cleaner of FIG. 1;
FIG. 5 is a rear elevational view of the ear cleaner of FIG. 1;
and
FIG. 6 is a front elevational view of the ear cleaner of FIG. 1.

DETAILED DESCRIPTION

Figure 1:
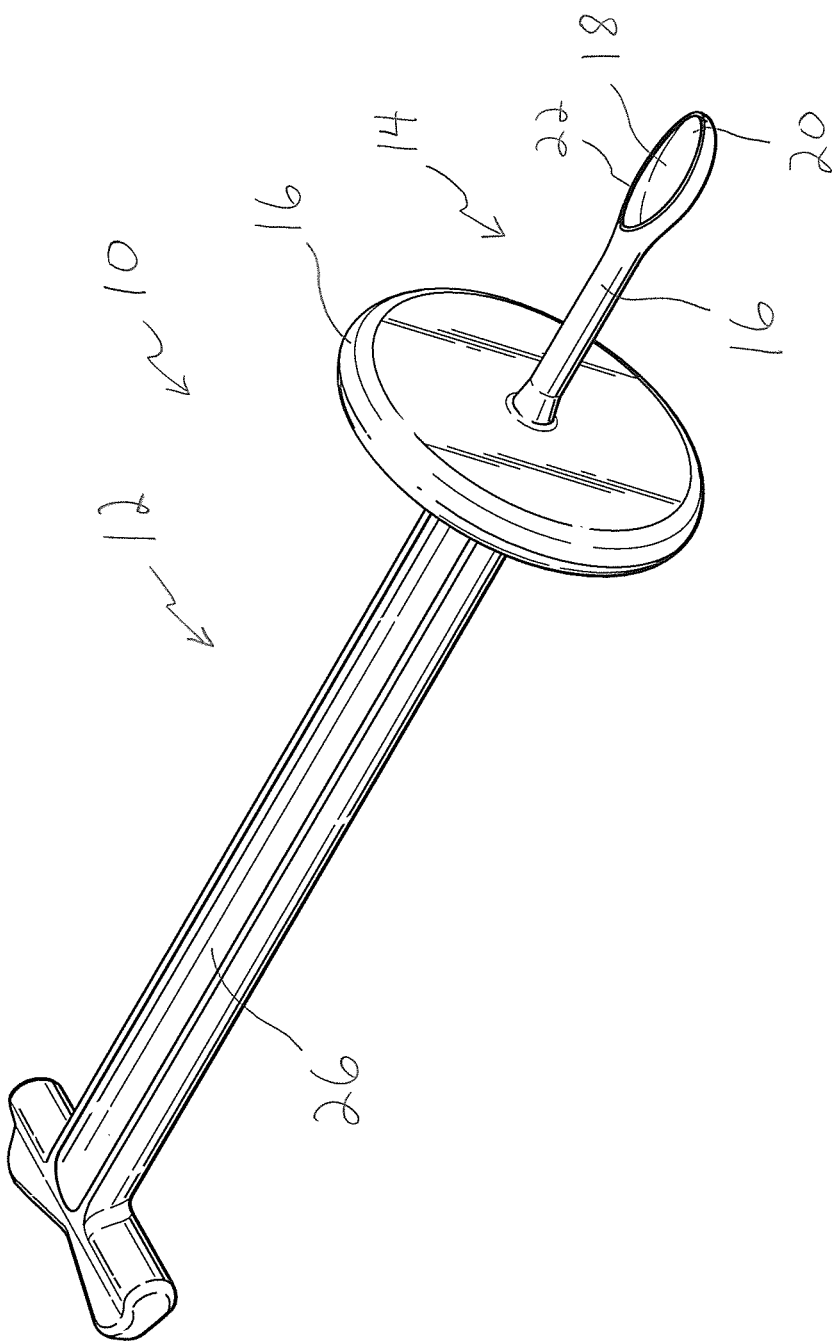
FIG. 1 is a perspective view of an ear cleaner.

With reference to FIG. 1, an ear cleaner 10 is provided having a handle 12, a spoon 14, and a disc 16 intermediate the handle 12 and spoon 14. The spoon 14 includes a neck 16 and a bowl 18 for scooping debris off of a surface, such as removing ear wax from a user's ear. The bowl 18 includes an opening 20 and a rim 22 extending about the opening 20.

With reference to FIGS. 1 and 2, the handle 12 has a length 24 and a groove 26 extending along the handle 12 for a majority of the length 24, such as extending substantially the entire length 24. The groove 26 has an inwardly curved surface 28. The groove 26 facilitates manipulation of the ear cleaner 10 by permitting a user to advance a tip of her finger into the groove 26 to help steer the ear cleaner 10. The groove 26 includes a groove lower surface 30 and the ear cleaner 10 has material, such as a ramp 32, extending upwardly from the groove lower surface 30 toward the disc 16. The ramp 32 strengthens the ear cleaner 10.

The ear cleaner 10 also includes a transverse gripping portion 40 having portions 42, 44 that extend outward from the handle 12 transverse to the length 24 of the handle 12. The transverse gripping portion 40 has a recess 45, which may receive a user's finger.

With reference to FIGS. 2 and 3, the bowl 18 includes a bowl inner surface 50 and a bowl outer surface 52. The bowl 18 includes a slot 54 extending from the bowl inner surface 50 to the outer bowl surface 52. In one form, the slot 54 has a length oriented to extend parallel to the length 24 of the handle 12. The slot 54 may be elongated.

With reference to FIG. 3, the handle 12 includes an outwardly extending curved surface 56. The outwardly curved surface 56 may extend for a majority of the length 24 of the handle 12.

The spoon 14 has a length 60 that is less than the length 24 of the handle 12. Further, the ear cleaner 10 may have an overall length 62.

With reference to FIG. 4, the rim 22 of the bowl 18 has an upper rear edge 70 and an upper front edge 72. The upper front edge 72 is disposed a distance 74 below the upper rear edge 70.

The handle 12 includes a transition portion 80 that includes the ramp 32 and lateral ramps 82. The transition portion 80 includes a cross-sectional dimension 84 that is larger than a cross-sectional dimension 86 of the handle 12.

The neck 16 includes a tapered portion 90 having a cross-sectional dimension 92 that is larger than a cross-sectional dimension 94 of the neck 16.

With reference to FIG. 4, the traverse gripping portion 40 may have a tapered portion 100 that transitions to a thin portion 102. The thin portion 102 has a cross-sectional dimension 104 that is less than the dimension 86 of the handle 12.

With references to FIGS. 4-6, the disc 16 has a rounded annular edge 110 and flat surfaces 112, 114 on opposite sides of the disc 16.

With reference to FIG. 5, the groove of the handle 12 includes longitudinal edges 120, 122 on opposite sides of the groove 26. The longitudinal edges 120, 122 extend from the transverse gripping portion 40 to the disc 16. The longitudinal edges 120, 122 provide easy to grip structures extending along the handle 12. The outwardly curved surface 56 may extend from one of the longitudinal edges 120, 122, such as from one of the longitudinal edges 120, 122 to the other. The outwardly curved surface 56 may extend from one of the longitudinal edges 120, 122 around the handle 12.

The transverse gripping portion 40 includes undercuts 123, 125 that form recesses in the transverse gripping portion 40.

The ear cleaner may have a unitary, one-piece construction. The ear cleaner may be made of plastic, such as injection-molded plastic.

While the foregoing description is with respect to specific examples, those skilled in the art will appreciate that there are numerous variations of the above that fall within the scope of the concepts described herein and the appended claims.

What is claimed is:

1. An ear cleaner comprising:
    an elongated handle having a length;
    a spoon that is configured to fit in a human ear;
    a disc connecting the spoon and the handle;
    the handle having a cross-section perpendicular to the length that varies along the length of the handle;
    a gripping portion of the handle having a first thickness; and
    a transition portion of the handle intermediate the gripping portion and the disc, the transition portion having a second thickness greater than the first thickness.

2. The ear cleaner of claim 1 wherein the gripping portion of the handle has a first cross-sectional area; and
    wherein the transition portion has a second cross-sectional area that is larger than the first cross-sectional area.

3. The ear cleaner of claim 1 wherein the transition portion has a thickness that increases as the transition portion extends away from the gripping portion and toward the disc.

4. The ear cleaner of claim 3 wherein the transition portion has a third thickness greater than the second thickness.

5. The ear cleaner of claim 1 wherein the cross-section of the transition portion of the handle increases in cross-sectional area as the transition portion extends away from the gripping portion and toward the disc.

6. The ear cleaner of claim 1 wherein the handle includes a groove extending along the length of the handle.

7. The ear cleaner of claim 6 wherein the handle comprises:
   a pair of longitudinal edges on opposite sides of the groove; and
   wherein the gripping portion of the handle includes a curved surface extending from one of the longitudinal edges to the other.

8. The ear cleaner of claim 1 wherein the transition portion of the handle includes a reinforcing member extending transverse to the length of the handle.

9. The ear cleaner of claim 1 wherein the gripping portion of the handle includes longitudinal edges extending parallel to the length of the handle; and
   wherein the transition portion of the handle includes at least one edge extending transverse to the longitudinal edges of the gripping portion.

10. The ear cleaner of claim 9 wherein the at least one edge of the transition portion of the handle comprises a pair of edges extending transverse to the length of the handle.

11. The ear cleaner of claim 1 wherein the handle includes a groove and the gripping portion of the handle includes a surface portion defining at least a portion of the groove; and
    wherein the transition portion of the handle includes a reinforcing member upstanding from the surface portion.

12. The ear cleaner of claim 1 wherein the spoon has a bowl and includes two arcuate edges, a leading juncture connecting the arcuate edges, and a trailing juncture connecting the arcuate edges across the bowl from the trailing juncture.

13. The ear cleaner of claim 12 wherein the leading juncture is lower than the trailing juncture.

14. The ear cleaner of claim 1 wherein the ear cleaner has a unitary, one-piece construction.

15. The ear cleaner of claim 14 wherein the ear cleaner is made of plastic.

* * * * *